(12) United States Patent
Aughton et al.

(10) Patent No.: US 10,114,388 B2
(45) Date of Patent: Oct. 30, 2018

(54) METHOD OF DEMAND MANAGEMENT AND CONTROL OF FLUID PIPE NETWORKS

(71) Applicant: Rubicon Research Pty Ltd, Hawthorn, Victoria (AU)

(72) Inventors: David John Aughton, Hawthorn (AU); Sumith Choy, Hawthorn (AU)

(73) Assignee: RUBICON RESEARCH PTY LTD, Hawthorn East, Victoria (AU)

( * ) Notice: Subject to any disclaimer, the term of this patent is extended or adjusted under 35 U.S.C. 154(b) by 410 days.

(21) Appl. No.: 14/916,181

(22) PCT Filed: Sep. 4, 2014

(86) PCT No.: PCT/AU2014/050208
§ 371 (c)(1),
(2) Date: Mar. 2, 2016

(87) PCT Pub. No.: WO2015/031954
PCT Pub. Date: Mar. 12, 2015

(65) Prior Publication Data
US 2016/0209851 A1 Jul. 21, 2016

(30) Foreign Application Priority Data
Sep. 4, 2013 (AU) .................................. 2013903383

(51) Int. Cl.
*E02B 13/00* (2006.01)
*F17D 1/00* (2006.01)
(Continued)

(52) U.S. Cl.
CPC .............. *G05D 7/0641* (2013.01); *F17D 1/00* (2013.01); *G05B 17/02* (2013.01); *G05D 7/0664* (2013.01); *G06F 17/00* (2013.01); *E02B 13/00* (2013.01)

(58) Field of Classification Search
CPC ........................ G05D 7/0641; G05D 7/0064
See application file for complete search history.

(56) References Cited

U.S. PATENT DOCUMENTS 5,941,305 A * 8/1999 Thrasher ............... E21B 43/121
166/53
7,152,001 B2 12/2006 Aughton et al.
(Continued)

FOREIGN PATENT DOCUMENTS

CN 101451613 6/2009
CN 101641654 2/2010
(Continued)

OTHER PUBLICATIONS

International Application No. PCT/AU2014/050208, International Search Report and Written Opinion dated Oct. 9, 2014.
(Continued)

*Primary Examiner* — Mohammad Ali
*Assistant Examiner* — Joshua Sanders
(74) *Attorney, Agent, or Firm* — David D. Brush; Westman, Champlin & Koehler, P.A.

(57) ABSTRACT

A method of demand management and control of fluid pipe networks including providing a computer controlled fluid network for delivery of fluid through a plurality of valves, maintaining a real time database of predetermined parameters including flow schedules and valve capabilities, requesting a flow rate and time of delivery of said fluid to at least one of said plurality of valves, determining availability of providing delivery and flow rate of fluid to the at least one of said plurality of valves based on hydraulic capacity of the fluid network, and calculating parameters using the database to deliver fluid to the at least one of said plurality of valves, whereby each of the plurality of valves is monitored and adjustably controlled to provide the flow rate and delivery through the at least one of said plurality of valves and manage the pressure head within said fluid pipe network between predetermined limits.

14 Claims, 8 Drawing Sheets

(51) Int. Cl.
  *G05D 7/06*    (2006.01)
  *G05B 17/02*   (2006.01)
  *G06F 17/00*   (2006.01)

(56) References Cited

U.S. PATENT DOCUMENTS

| | | | |
|---|---|---|---|
| 2002/0117214 A1* | 8/2002 | Tucker | G05D 16/2053 137/487.5 |
| 2004/0181315 A1 | 9/2004 | Cardinal et al. | |
| 2008/0082215 A1* | 4/2008 | McDowell | F17D 3/01 700/282 |
| 2009/0069922 A1 | 3/2009 | Dattolo et al. | |
| 2009/0112422 A1 | 4/2009 | Sah et al. | |

FOREIGN PATENT DOCUMENTS

| | | |
|---|---|---|
| CN | 101858095 | 10/2010 |
| CN | 101872161 | 10/2010 |
| JP | H09217900 | 8/1997 |
| KR | 20090002115 | 1/2009 |
| WO | 2008090359 | 7/2008 |
| WO | 2011020143 | 2/2011 |
| WO | 2012129609 | 10/2012 |
| WO | 2013016769 | 2/2013 |
| WO | 2013149304 | 10/2013 |
| WO | 2014082121 | 6/2014 |

OTHER PUBLICATIONS

Notice of Acceptance dated Aug. 22, 2017 for corresponding AU Application No. 2014317812.
Examination Report No. 1, dated Jun. 2, 2017 for corresponding AU Application No. 2014317812.
Examination Report No. 2, dated Jul. 7, 2017 for corresponding AU Application No. 2014317812.
Chinese Patent Application No. 2014800553281, First Office Action dated Feb. 16, 2017.

* cited by examiner

METHOD OF DEMAND MANAGEMENT AND CONTROL OF FLUID PIPE NETWORKS

CROSS-REFERENCE TO RELATED APPLICATIONS

This application is a national stage application pursuant to 35 U.S.C. § 371 of International Application No. PCT/AU2014/050208, filed Sep. 4, 2014, which claims priority to Australian Patent Application No. 2013903383, filed Sep. 4, 2013, the disclosures of which are hereby incorporated by reference herein.

FIELD OF THE INVENTION

The present invention relates to a method of demand management and control for limited pressure head or gravity fed fluid closed conduit networks, and relates particularly, though not exclusively, to a method of demand management and control for limited pressure head or gravity fed water irrigation pipe networks.

BACKGROUND OF THE INVENTION

In our U.S. Pat. No. 7,152,001, the entirety of which is herein incorporated, there is disclosed a computer based system for predicting the fluid level in a fluid flow network. The system has been very successful as it can use past and present measurements of parameters to predict and control fluid level and flow. The system gathers data from timed fluid levels and opening positions of regulators or valves to provide a model from which fluid levels and flow can be determined in real time.

In our International Patent Application No. PCT/AU2012/000907, the entirety of which is herein incorporated, there is disclosed a method of demand management for fluid networks. The method was applicable to both a closed conduits (pipeline network) and open conduits (channel networks), Gravity pipe networks typically operate within limited pressure head and therefore are constrained in their capability to meet demand.

Known models for pipe networks would be used in the management of demand for these networks. Data from the SCADA system would be used to calibrate and continually fine-tune the model of the pipe conveyance network based on system identification techniques. Flow measurement and pressure head measurements would be located at points on the pipe network that would be deemed necessary to calibrate the model to the desired accuracy. The supply points to users are the primary form of control used with a pipe network. The controller for a pipe network is much simpler than it is for a channel network with the principle form of control being maintaining the flow at the supply point equal to that of the order.

Control and management of demand is especially applicable to gravity pipe networks commonly used for the supply of irrigation water. Difficulties have arisen to implement such systems as gravity pipe networks typically operate within limited pressure head and therefore are constrained in their capability to continually meet demand. Gravity pipelines also typically operate at lower pressure heads where there will be greater interaction between flows at outlets due to valve operations. Accordingly, assuming all the parameters such as pipe diameter, flow rate, valve size, etc being the same, the higher the static pressure head (e.g. from pumping), the less sensitive the impact of flow fluctuations due to valve operations (e.g. valves opening or closing) on other valves in operation.

FIG. 1 illustrates why operating valves are less sensitive to flow variations in the supply pipeline (e.g. from other opening and closing valves) with a higher pressure head in the pipeline. FIG. 1 shows a graph of the hydraulic grade line or pressure head against the valve position for a high pressure at line 10 and for a low pressure or gravity fed hydraulic grade line or pressure head at line 12. Gravity fed pipe 14 is shown on a grade with two valves 16 and 18. Although pipe 14 is shown on a grade, it could be horizontal if the water supply is elevated to provide the required pressure head. For line 10, pipe 14 would be coupled to a pump (not shown) to produce a high-pressure head. The explanation now follows:

1. Assume the one physical pipeline 14 operating at either a Low Pressure (LP) state and at a High Pressure (HP) state, and for a specific operating valve supplying fluid off the pipeline 14.
2. Assume initially the supply pipeline 14 is operating at the same flow rate $Q_1$ in both states.
3. A change in flow in the supply pipeline 14 (due to other valves 16, 18 starting and stopping) occurs for both states.

$$\Delta Q = Q_1 - Q_2$$

4. The change in pressure head, $\Delta h$, at the operating valve 16 due to the change in flow $\Delta Q$, is the same for both states. (The known pipeline flow versus pressure head equations, e.g. Colebrook-White equation, Manning's Formulae are applicable)
5. The head loss across valve 16 is determined as follows;

$$h = K\left(\frac{v^2}{2g}\right)$$

where
h=pressure loss in terms of fluid head, i.e. fluid head loss
K=the valve 'K' factor (assume constant) for the specified valve opening
v=velocity of fluid
g=acceleration due to gravity 6. Assume the same initial flow, and therefore velocity, through the operating valve 16 in both the LP and HP states are equal $$v_{LP1} = v_{HP1}$$

$$\frac{h_{LP1}}{K_{LP}} = \frac{h_{HP1}}{K_{HP}}$$

7. With $h_{LP1} \ll h_{HP1}$ $$K_{LP} \ll K_{HP}$$

where $K_{LP}$ and $K_{HP}$ represent the different K factors for the different valve openings in either pressure state i.e. valve 16 will be at a greater opening in the LP state than the HP state.

8. When a pressure head change, $\Delta h$, is introduced, the change in pressure head across valve 16 for each state $h_{LP2} = h_{LP1} - \Delta h$, and $h_{HP2} = h_{HP2} - \Delta h$ respectively. The relative change in head across the valve is greatest in LP state than the RP state, 9, Assuming valve 16 remains in the same opening position for each state, and therefore the K factors remain the same, the new velocity for each state is $$v_{LP2} = \sqrt{(h_{LP1} - \Delta h) 2g / K_{LP}}$$

$$v_{HP2} = \sqrt{(h_{HP1} - \Delta h) 2g / K_{HP}}$$

10 The resulting velocities for each state due to the pressure head change, $\Delta h$, will see;

$$(v_{LP2} - v_{LP1}) \gg (v_{HP2} - v_{HP1})$$

The change in velocity, and therefore flow through the valve is much greater for the LP state than for the HP state.

Higher pressure (e.g. pumped) pipelines with smaller diameter valves and flow meters have less interaction between operating valves than low-pressure pipelines with larger diameter valves and flow meters. In high pressure systems the valves can be manually positioned to a set opening to achieve a certain flow, and the flow will not be impacted significantly by the operation of the other valves (e.g. valves opening or closing) in the pipeline. Whereas, low-pressure pipelines require an integrated control and demand management system to manage the valve interaction within the tight hydraulic grade line conditions.

FIG. 2 shows pipeline 14 separated from FIG. 1 and illustrates the maximum supply pressure 22 which must maintain the pipeline full to ensure the accuracy of the flow meters (not shown) associated with valves 16, 18, and 20. It is important to keep the pipeline full to make the control problem simple and tractable as a "pipe not full" scenario will significantly change the physics that governs the dynamics of pipe flow. Pipe flow transitioning between "pipe full" and "pipe not full" states will make achieving robust control intractable. Maintaining the hydraulic grade line 12 associated with the pipeline 14 above the maximum supply pressure 22 will also ensure that the pressure head at the valves 16, 18 and 20 are high enough to guarantee the flow rate the valves were designed for. The low-pressure head or hydraulic grade line 12 associated with pipeline 14 will potentially result in increased controller interaction between the discrete control actions necessary to maintain desired flows at the valves. This is further compounded with gravity pipelines where the flow capacity at the valves is high in relation to the overall flow capacity of the main trunk pipeline The action of opening or closing valves will impact the pressure head, and therefore flow, at all other valves on the pipeline 14 that are operating. Therefore there will be interaction between various automated valves operating off the pipeline. In this low energy pipeline, the control will be subject to instability. Each movement in a valve has a level of interaction with all the other operating valves plus supply level variation at the source or at the outlet (on-farm). Because of the low pressure in the pipeline 14, the hydraulic grade line 12 is very sensitive to the operation of the valve/outlets.

This sensitivity is illustrated in FIG. 3 where a graph of flow and time is shown. Line 24 illustrates valve 16 being already open and the effect that the opening of valve 18 has on the network. Line 26 illustrates the flow of valve 18. Both valves 16 and 18 are trying to maintain their preselected flow rate but the valves produce an unstable jittery interaction between the valves. The interaction is fairly minor on the flow through valve 16 shown by the changes in flow at 28 but there is a major interaction on the stability of flow through valve 18 shown by the changes in flow at 30. Furthermore, all the additional valves e.g. valve 20 will also be effected by this interaction. The network becomes extremely unstable and this is a key reason why gravity feed irrigation systems have found little favour with water suppliers and users.

OBJECTS OF THE INVENTION

It is an object of the present invention to provide a method of demand management and control of limited pressure head or gravity fed fluid pipe networks for closed conduit fluid networks to maintain a requested flow rate despite variations in the pressure head in said fluid network.

A further object of the present invention to provide a method of demand management and control of limited pressure head or gravity fed fluid pipe networks for closed conduit fluid networks that avoids instability that can occur from the interaction between operating valves.

SUMMARY OF THE INVENTION

The present invention in one aspect provides a method of demand management and control of limited pressure head or gravity fed fluid pipe networks, said method including the steps of providing a computer controlled fluid network for delivery of fluid through a plurality of valves, maintaining a real time database within said computer controlled fluid network of predetermined parameters including flow schedules and capabilities of said plurality of valves, requesting, through a user interface, a flow rate and time of delivery of said fluid from the fluid network to at least one of said plurality of valves, determining, using said predetermined parameters from said real time database, the availability of providing said delivery and flow rate of said fluid from the fluid network to said at least one of said plurality of valves based on hydraulic capacity of said fluid network, and, if said hydraulic capacity is available, calculating parameters using said real time database to deliver said fluid to said at least one of said plurality of valves through said computer controlled fluid network, whereby each of said plurality of valves is monitored and adjustably controlled to provide said flow rate and delivery through said at least one of said plurality of valves in unison with the monitoring and controlling of the others of said plurality of valves to maintain the flow and manage the pressure head within said fluid pipe network between predetermined limits.

Preferably the method further includes pre-empting the valve position of at least one of the others of said plurality of operating valves to maintain their flow rate in anticipation of the variation of pressure head in the fluid pipe network due to said delivery through said at least one of said plurality of valves. The method may also include a respective feedback controller associated with each of said plurality of valves to allow fine-tuning of the valve position of each valve. A respective feed-forward controller may also be provided to vary the valve position of said valves to a best estimate position based on one or more of the following: monitored hydraulic capacity of said fluid pipe network; predicted pressure head change at the respective valves based on future flow schedule maintained in the real time database; and valve rating associated with the respective valves. It is proposed that said feed-forward and feedback controllers are associated with respective valves.

The invention may also use data from an interface to calibrate and continually fine tune the valve rating for the respective valves using data fitting techniques.

In yet a further embodiment there is provided a supervisory control layer within said computer control to monitor and control the feed-forward and feedback controllers for each valve, to prevent the interaction between the various operating valves, maintain the pressure head within said fluid pipe network between predetermined limits, and handle exception events as per predetermined business rules.

Preferably the method further includes the steps of allowing a plurality of customers to access said user interface and said computer controlled fluid network determining a priority and weighting of flow rate and time of delivery requests of said fluid to ensure continuance of said hydraulic capacity. The priority and weighting of delivery requests may include tariff structures for said customers based on best use of available hydraulic capacity.

In a further embodiment data from an interface is used to calibrate and continually fine tune the computer controlled fluid network using a model of the fluid pipe network based on system identification techniques. The method may also include the step of rescheduling said flow rate and time of delivery of said fluid from the fluid network if said hydraulic capacity is not available.

In a practical embodiment the method includes the step of said computer controlled fluid network controlling operation of a hybrid pump to maintain pressure head. The plurality of valves may include bi-foldable harder members pivoting along a central axis to provide an approximate linear relationship between the opening of the bi-foldable barrier members and the fluid flow.

Preferably said predetermined parameters includes business rules and constraints to allow for further variations of said flow rate and time of delivery of said fluid through any valve. The method may include the step of any subsequent flow rate and time delivery request resulting in the maximum and minimum thresholds of flow limits through said fluid network being breached will be denied or rescheduled to allow said subsequent request to proceed based on said calculated parameters.

The invention also provides a method of demand management and control of limited pressure head or gravity fed fluid pipe networks, said method including the steps of providing a computer controlled fluid network for delivery of fluid through a plurality of valves, maintaining a real time database within said computer controlled fluid network of predetermined parameters including flow schedules and capabilities of said plurality of valves to provide a. model of the fluid pipe network, requesting, through a user interface, a flow rate and time of delivery of said fluid from the fluid network to at least one of said plurality of valves, determining, using said predetermined parameters from said real time database, the availability of providing said delivery and flow rate of said fluid from the fluid network to said at least one of said plurality of valves based on hydraulic capacity of said fluid network, and, if said hydraulic capacity is available, calculating parameters using said real time database to deliver said fluid to said at least one of said plurality of valves through said computer controlled fluid network, whereby each of said plurality of valves is monitored and adjustably controlled to provide said flow rate and delivery through said at least one of said plurality of valves in unison with the monitoring and controlling of the others of said plurality of valves to maintain the flow and manage the pressure head within said fluid pipe network between predetermined limits.

The invention also relates to a system that uses the methods as previously described.

BRIEF DESCRIPTION OF THE DRAWINGS

The structure and functional features of a preferred embodiment of the present invention will become more apparent from the following detailed description when taken in conjunction with the accompanying drawing, in which.

DESCRIPTION OF THE PREFERRED EMBODIMENT

Figure 4:
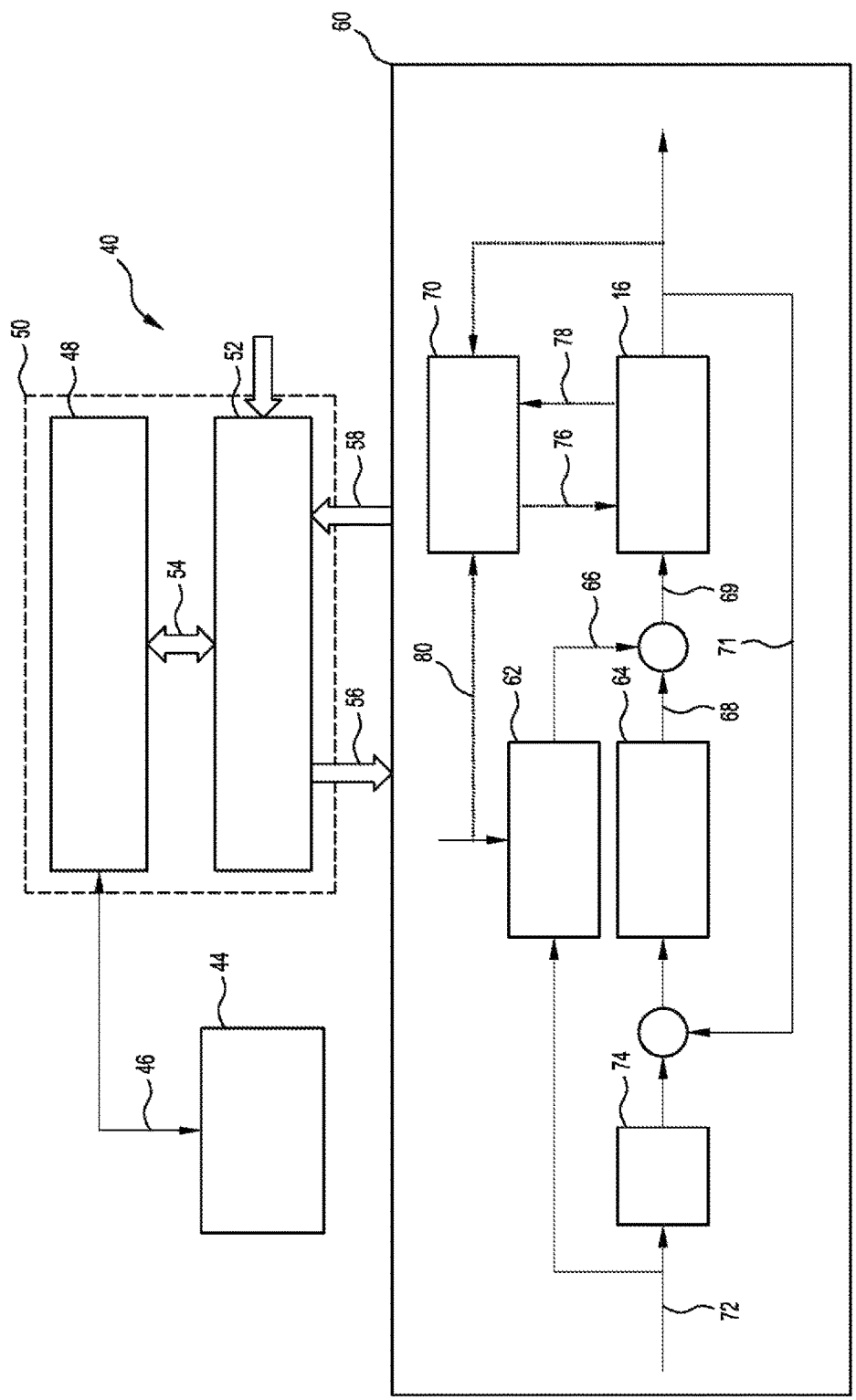
FIG. 4 is a block diagram of the architecture of the low pressure or gravity fed irrigation system according to a preferred embodiment of the present invention.
Figure 5:
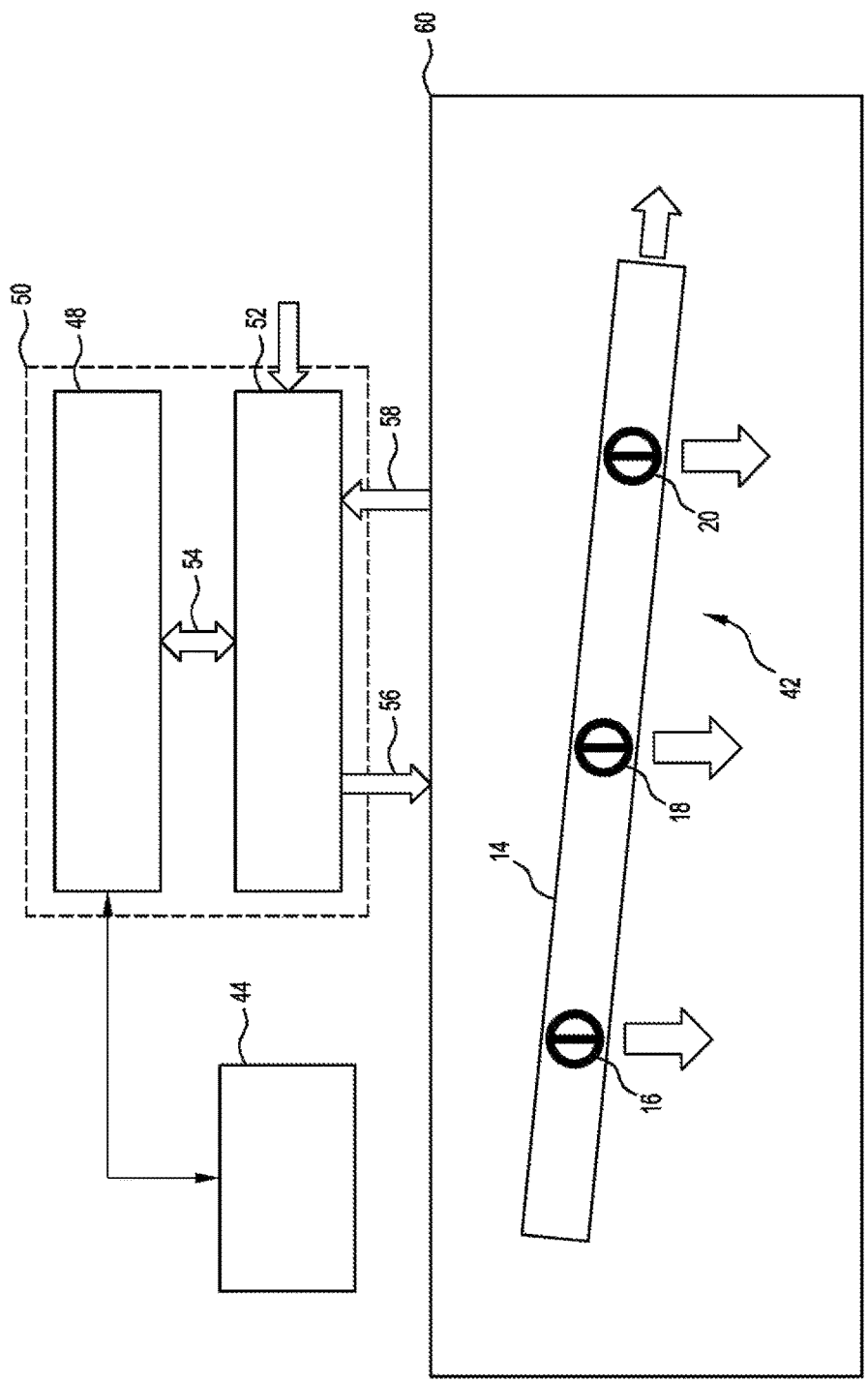
FIG. 5 is a similar drawing to that of FIG. 4 overlaid with a low pressure or gravity fed pipeline.

FIG. 4 shows a flow diagram of a demand management and control system 40 for a gravity fed irrigation network 42 (FIG. 5). The system 40 has a user interface 44 which allows customers to select a time frame and flow rate for valves 16, 18 and 20. The number of users and valves is not limited but is managed by the system 40. Interface 44 can be a computer, keyboard or an Internet based application to allow the user to enter their requests 46 into system 40. The requests 46 and the returned confirmations to the user are monitored by a demand management system 48 implemented in a central computer 50. The demand management system 48 includes a real time database that maintains predetermined parameters including flow schedules, capabilities of valves, business and control rules A supervisory layer 52 is also implemented in the central computer 50. Supervisory layer 52 is linked to the demand management system 48 through port 54 and updates and receives flow schedules and constraint information.

Supervisory layer 52 communicates with each valve 16, 18 and 20 to cause the valves to be controlled through port 56 and to receive the measured flow and performance information through port 58. Each valve 16, 18 and 20 has a valve control interface 60 although FIG. 4 only shows one interface 60. Each valve control interface 60 can be in the form of a remote terminal unit (RTU) or programmable logic controller (PLC). It is evident that each valve will require a respective valve control interface. The location of the respective valve control interface(s) 60 can be with the central computer 50, or remotely located with the respective valve.

Valve 16 is typically of the type shown in FIGS. 17 to 79 of International Patent Application No. PCT/AU2012/000328, the contents of which are incorporated herein. Valve 16 will be associated with a flow meter (not shown), typically of the type shown in International Patent Application No. PCT/AU2010/001052, the contents of which are incorporated herein. The advantage of this type of valve is the approximately linear relationship between the valve opening (angular position) and flow. This ensures a relatively accurate flow setting is achieved using the predetermined valve opening. Other valve, mechanisms, such as butterfly valves that are commonly used in the water industry, do not possess this linear characteristic and would therefore have difficulty in achieving the required valve rating (to be described later) and the associated control. The preferred embodiment is not limited to these type of valves or flow meters but these valves and flow meters are well suited to the task. Each flow meter will provide the measured flow and performance information through port 58. Each valve 16 has a feed forward controller 62 and a feedback controller 64 whose outputs 66, 68 cause actuation of valve 16 via signal 69. The flow rate is measured by the flow meter (not shown) and sent to port 58, to feedback controller 64 through signal 71 and to a valve calibration section 70. The flow order 72 from port 56 for the valve 16 is delivered to both the feed forward controller 62 and the feedback controller 64. Typically, the feed forward controller 62 will lead the action of the feedback controller 64 using an optional delay switch 74. It is preferred that both the feed forward controller 62 and the feedback controller 64 be provided but the system can also function with only one of these controllers.

Control strategy for low energy pipelines is one of managing the interactions of the controllers of each valve in a defined control methodology. Knowledge of the dynamics of the pipe 14 through the fluid network model will be used to design controllers using already well known classical control theory, and the knowledge of the future demand. The valve rating and measurement of the current pressure head conditions in the pipe 14 will be used to feed-forward to the valve 16 movements through controller 62. The valve rating is the derived relationship between;

the valve opening,
the differential pressure head at the valve 16, and
the flow.

The valve rating will be calibrated during normal operation by the valve calibration section 70 using the data recorded for the aforementioned parameters during the normal operation of the valve 16. The valve rating is derived using System Identification techniques. The adjusted valve rating will be sent to valve 16 at 76 and the valve opening will be returned to valve calibration section 70 through signal 78, The valve rating allows a predetermined control action to send valve 16 to a particular opening for a known pressure head in order to achieve a desired flow. The valve rating facilitates a bulk control adjustment without relying on feedback control using the flow measurement.

Figure 3:
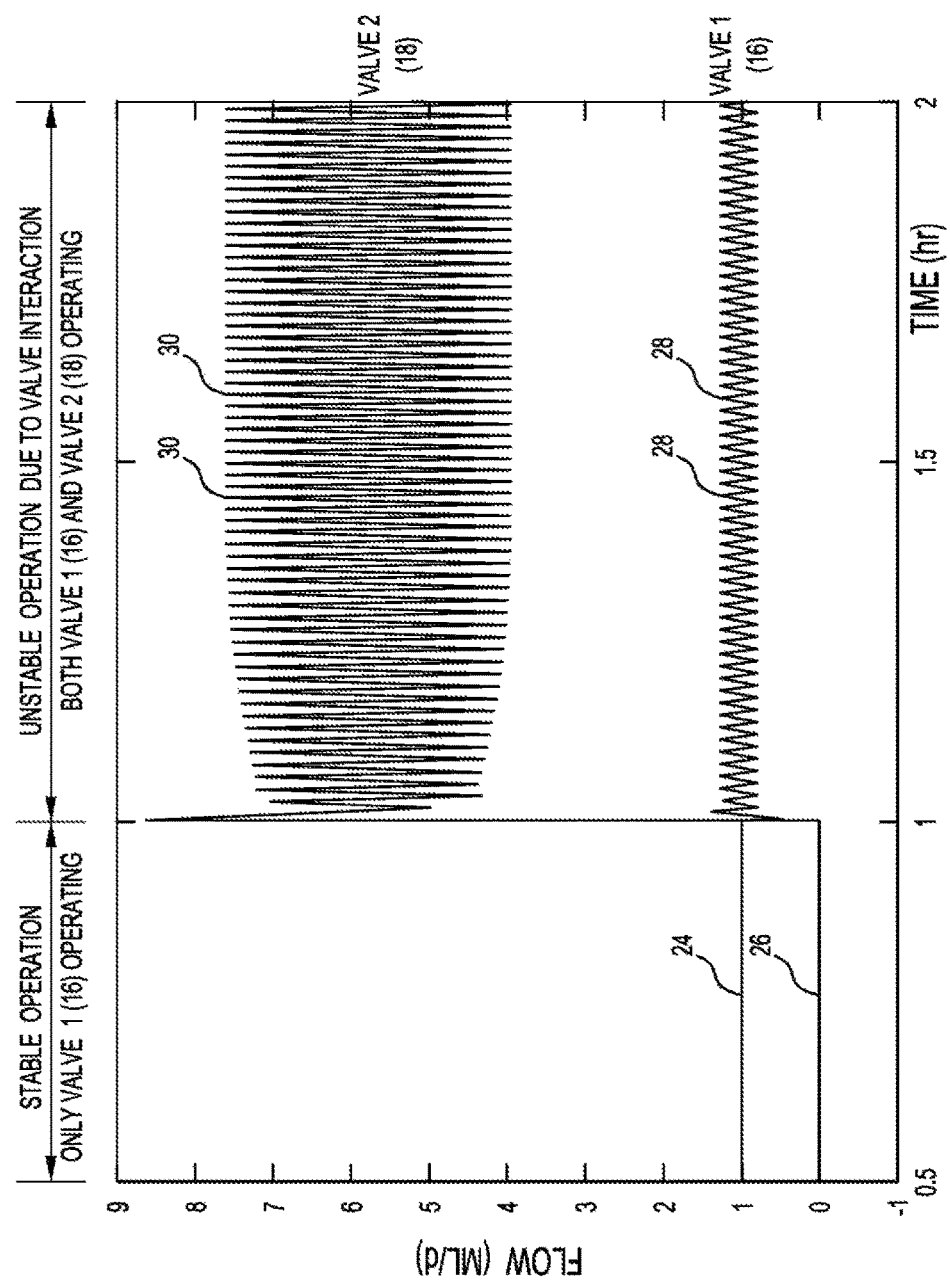
FIG. 3 is a graph of the flow and time for switching of valves shown in FIG. 2 showing the unstable behavior of the valves.
Figure 6:
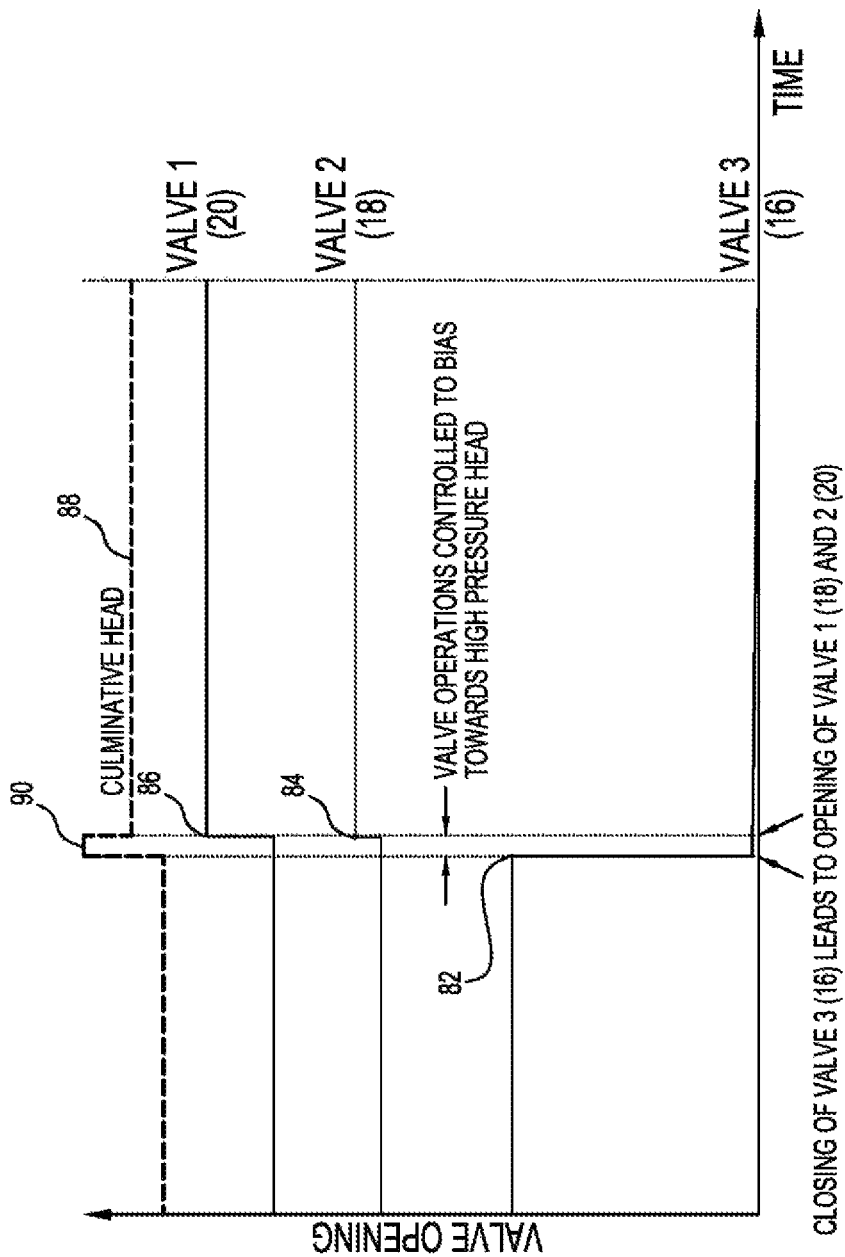
FIG. 6 is graphical representation of the valve operation to bias towards a high pressure head.
Figure 7:
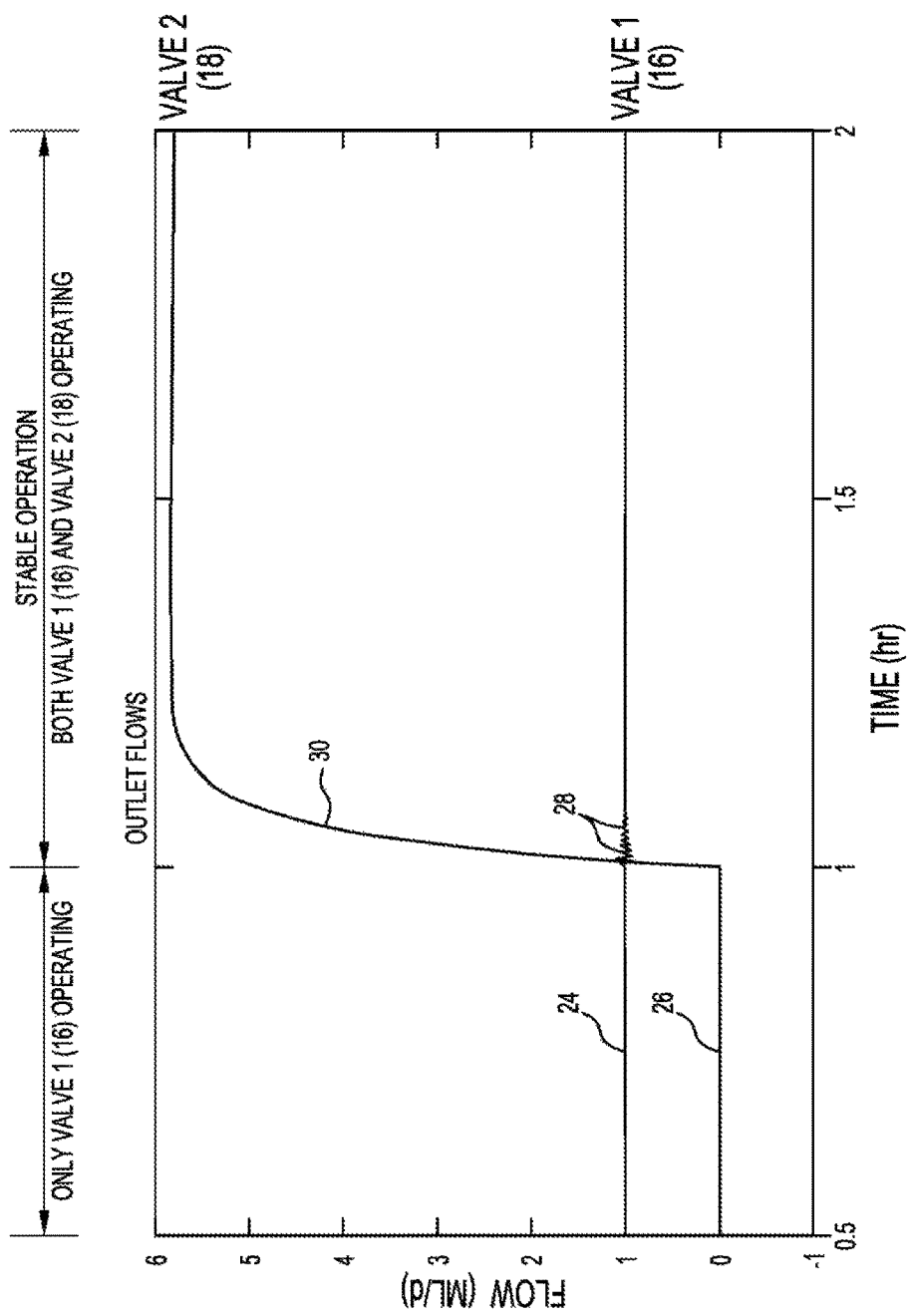
FIG. 7 is a similar view to that of FIG. 3 showing the stable behavior of the valves using the system shown in FIG. 4.

The system 40 provides control such that that hydraulic grade line is biased towards the high end of the spectrum. With reference to FIG. 6 it shows that valve 16 is operating and valves 18 and 20 are about to open. FIG. 6 graphically shows the static, as opposed to the dynamic, operation of the three valves. Valve 16 is due to stop at point 82 and valves 18 and 20 are to open at the same time. By offsetting the opening of valves 18 and 20 to points 84 and 86 the closing event of valve 16 will be initiated first to make extra pressure head 90 available as can be seen from the accumulative pressure head line 88. Thus the closing action of one or more valves will always lead (advance in time) any opening action of other valves. This control sequence ensures fluctuations in the pressure head (hydraulic grade line) due to control actions always result in a pressure greater than that predicted by the model and ensures that the pressure head does not drop below that predicted by the model within the demand management system 48. It is important the hydraulic grade line does not drop below a minimum supply level at valve as this can result in the pipe becoming "not full" and flow measurement would likely to be in error. In addition, maintaining the hydraulic grade line above a critical minimum level for valves is an important object of the low energy pipeline to guarantee an ordered flow can be achieved through the network. The command to deliver a flow at the valve will be provided by the demand management system 48 once the order passes the capacity checks. When the time arrives to open the valve, the feed-forward controller 62 kicks in first and moves the valve to a best estimate position to deliver the requested flow based on the local pressure head and valve rating. The feedback controller 64 only does the fine adjustments. In the preferred embodiment there will be an ability to use the feedback controller 64 or the feed forward controller 62 individually, or in combination as discussed previously. Such a methodology will minimize the transients in the pipeline and hence the interactions. This is a uniqueness of the solution FIG. 7 is a similar view to that of FIG. 3 showing the stable behaviour of the valves using the system shown in FIG. 4. Line 24 illustrates valve 16 being already open and the effect that the opening of valve 18 has on the network. Line 26 illustrates the flow of valve 18. Both valves 16 and 18 are trying to maintain their preselected flow rate. The major jittery interaction shown in FIG. 3 at 30 has been substantially reduced in FIG. 7 using the system of this preferred embodiment. Similarly, the jittery interaction show in FIG. 3 at 28 has also been substantially reduced. The improvement in control and steady flows through the valves even when multiple valves are operating is evident.

Figure 1:
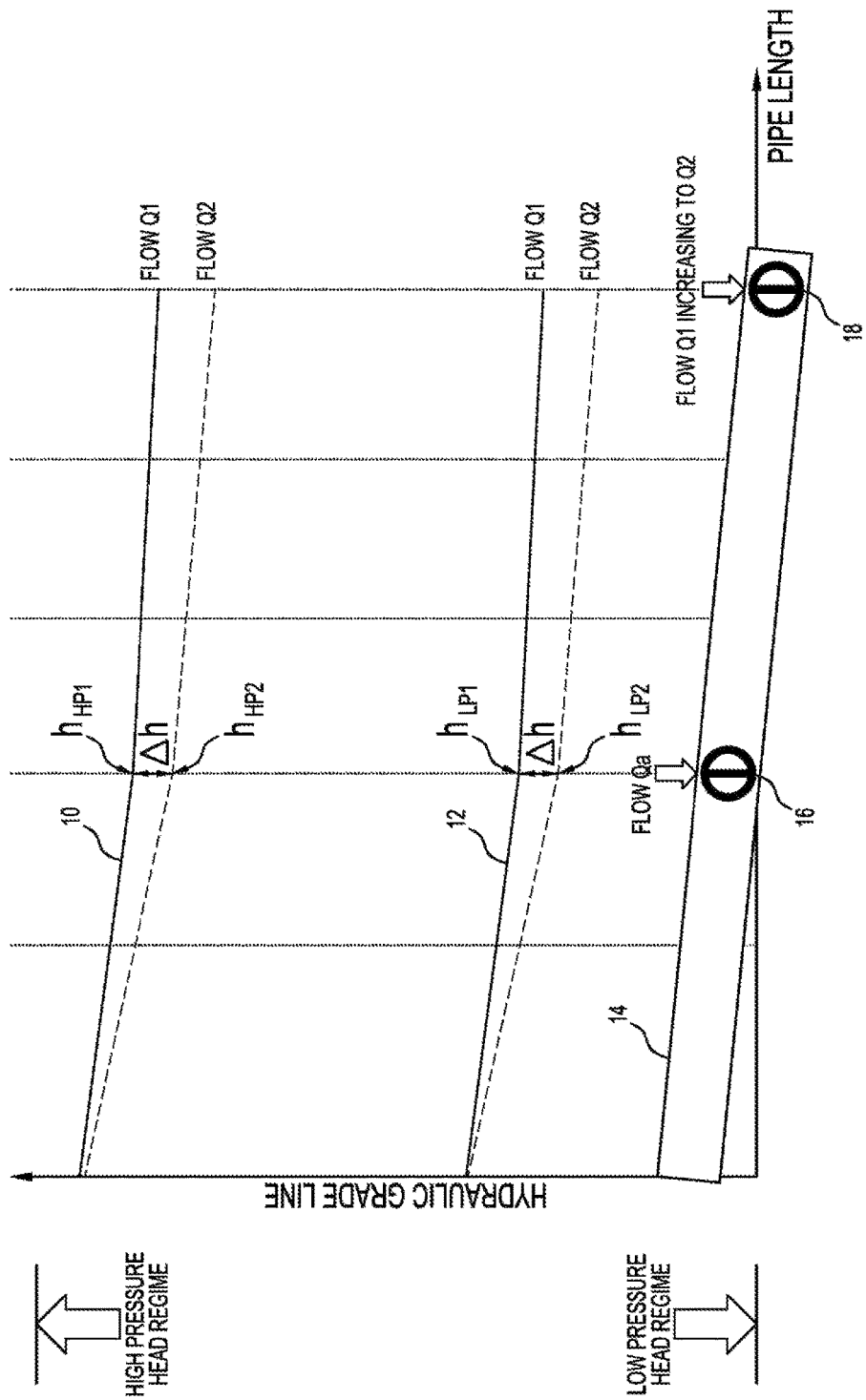
FIG. 1 is a graph of the hydraulic grade line or pressure head against the valve position for a high pressure irrigation system and for a low pressure or gravity fed hydraulic grade line or pressure head irrigation system.
Figure 2:
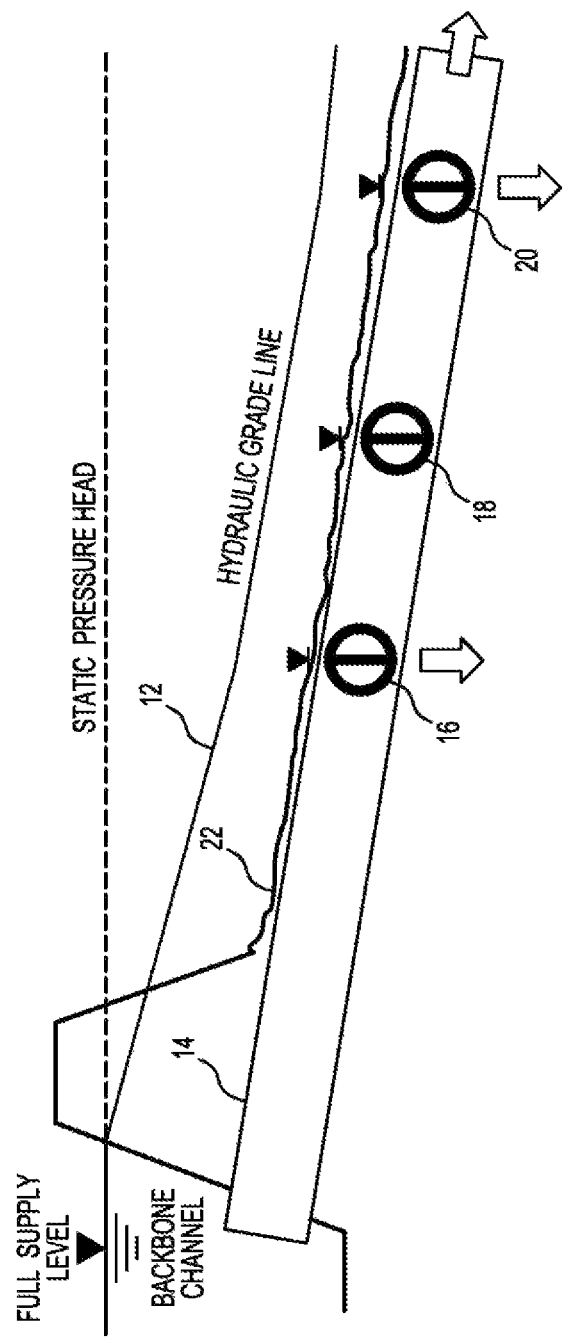
FIG. 2 shows a schematic drawing of the low pressure or gravity fed hydraulic grade line or pressure head irrigation system with the valves and hydraulic grade line.
Figure 8:
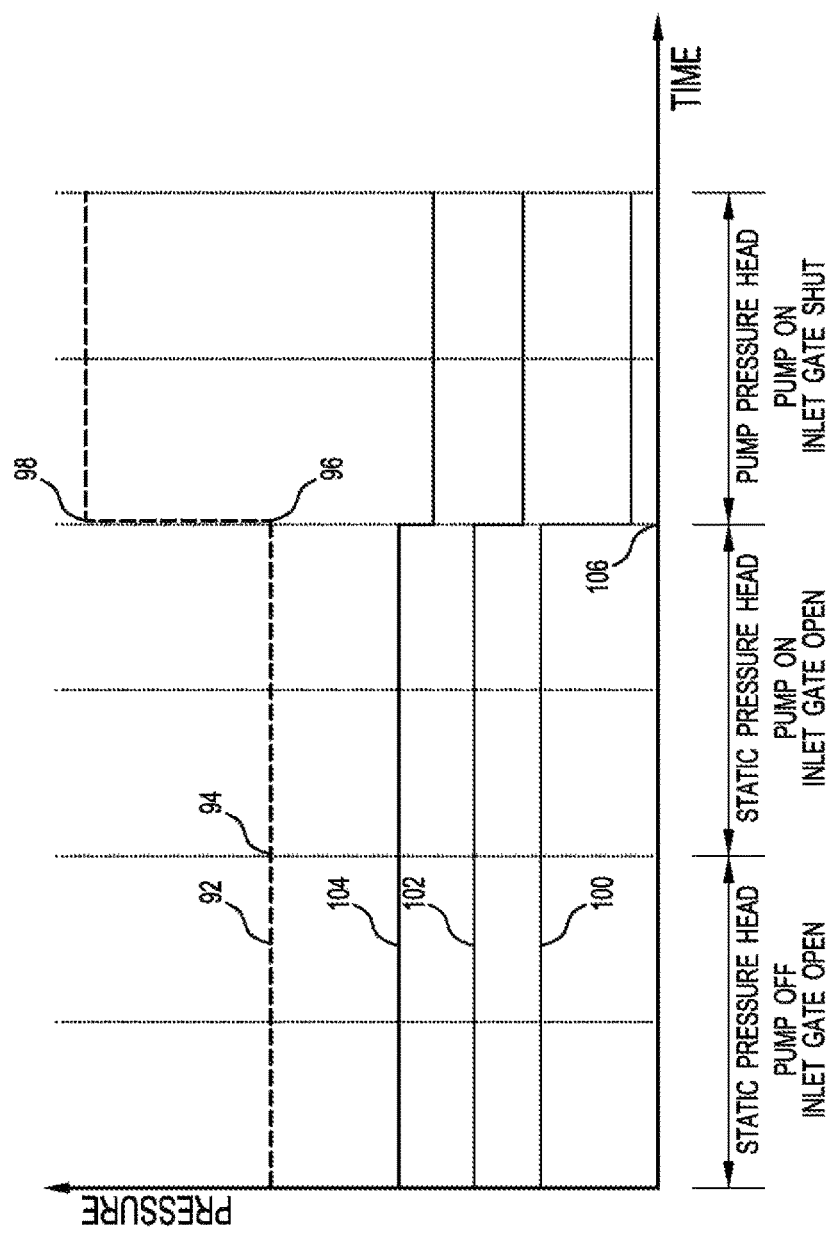
FIG. 8 is a graphical representation where a hybrid pump is installed in the low pressure or gravity fed irrigation system.

The invention can also be used in association with irrigation system that include a hybrid pump for increasing the flow rate when an increase in flow rate is required. Such a system is shown in our Australian Patent Application Nos. 2012905225 and 2012905508, the contents of which are herein incorporated. FIG. 1 of these applications disclose a main pipeline 20 and a branch pipeline 30 that opens into main pipeline 20. The branch pipeline 30 has a low head lift pump 34 that provides an increased flow rate when required by the system. An inlet gate 22 on main pipeline 20 will be closed when pump 34 is operating. In FIG. 3 of these applications a further embodiment is shown where branch pipeline 30 is omitted and an inline pump 36 is provided in the main pipeline 20. The effect of the hybrid pump 34 of FIG. 1 with inlet gate 22 of Australian Patent Application Nos 2012905225 and 2012905508 is shown in FIG. 8. The graph shows pressure against time with line 92 showing the cumulative pressure head. The hybrid pump is turned on at point 94 but the pressure does not increase until the inlet gate is closed at point 96. The pressure will increase to the pressure shown at point 98. The increase in pressure will remain whilst the inlet gate is closed and the hybrid pump operates. Lines 100, 102 and 104 coincide with the movements of respective valves 20, 18 and 16, Valves 20, 18 and 16 are all open at point 106 at various flow rates and the system 40 will instruct the valves to adjust their valve openings to maintain their respective flow rates as the increased pressure from the hybrid pump is applied.

The use of a hybrid pump will also have an impact on the hydraulic grade line when the pump is starting up or shutting down. The operation of the associated inlet gate (closing) at the pipe inlet allows for the gradual input of the raised pressure head from the pump. This would begin once the pump has been turned on. As the gate closes, the pressure head in the pipeline will increase. This will be undertaken gradually and potentially in a stepwise approach with corresponding offset (leading) valve adjustments occurring at each step. The step and the delay will be a function of the dynamics of the pipe such that valve interactions are kept to a minimum. Similarly the inlet gate could open gradually prior to the pump shutting down. The corresponding offset (lagging) valve adjustments would occur in a sequence with a stepwise opening of the inlet gate. Where there is a control objective to keep the hydraulic grade line below a particular maximum operating pressure the opening of a valve would lead the corresponding closing of another valve. The system would be programmed so that these circumstances can be identified and the appropriate control action taken.

The supervisory layer 52 will monitor the performance of the pipe network 42 holistically and will have information about the topology. The supervisory layer 52 can include high level rules to operate the valves 16, 18, 20 to bias them towards a high pressure head, rules to mitigate the effects of interaction, and rules to follow during exception events. Interactions between controllers for each valve will be monitored by supervisory layer 52 through a further set of rules. Performance will be continuously monitored and deterioration in performance identified. An automatic rule based check will be performed to progressively turn off the feedback component of the valves in the network if control loop interaction is observed until the poorly performing valve is identified. Once identified, the poorly performing valve will have its control suspended, while the others will have the feedback turned back on.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

Throughout this specification and the claims which follow, unless the context requires otherwise, the word "'comprise", and variations such as "comprises" and "comprising", will be understood to imply the inclusion of a stated integer or step or group of integers or steps but not the exclusion of any other integer or step or group of integers or steps.

The reference to any prior art in this specification is not and should not be taken as an acknowledgement or any form of suggestion that the prior art forms part of the common general knowledge in Australia.

The invention claimed is:

1. A method of demand management and control of a pipe network;
   the pipe network being a computer controlled fluid network and of limited pressure head or gravity fed;
   the pipe network including a plurality of outlet valves through which fluid is deliverable;
   the valves being automated to maintain desired flows at the valves;
   the method including:
      maintaining a real time database within said computer controlled fluid network; and
      receiving through a user interface a request for a delivery of the fluid from at least one of the valves;
      the request including a flow rate and a time of the delivery;
      the database being of predetermined parameters including flow schedules and capabilities of the plurality of valves;
   the method further including
      determining, using the predetermined parameters from the real time database, whether the network has hydraulic capacity to deliver the delivery; and
      if said hydraulic capacity is available, monitoring and adjustably controlling the at least one valve and at least one other of the plurality of valves to deliver the delivery and to maintain the desired flows and manage pressure head within the fluid pipe network between predetermined limits;
   The adjustably controlling including:
      calculating, using the real time database, estimated positions for
         the at least one of the plurality of valves; and
         the at least one other of the plurality of valves;
      adjusting to the estimated positions
         the at least one of the plurality of valves; and
         the at least one other of the plurality of valves in anticipation of a variation of pressure head in the fluid pipe network due to the delivery.

2. The method of claim 1 further including a respective feedback controller associated with each of said plurality of valves to allow fine-tuning of the valve position of each valve.

3. The method of claim 1 further including:
   allowing a plurality of customers to access said user interface; and
   the computer controlled fluid network determining a priority and weighting of flow rate and time of delivery requests of the fluid to ensure continuance of said hydraulic capacity.

4. The method of claim 3 wherein said priority and weighting of delivery requests includes tariff structures for said customers based on best use of available hydraulic capacity.

5. The method of claim 1 wherein data from an interface is used to calibrate and continually fine tune the computer controlled fluid network using a model of the fluid pipe network based on system identification techniques.

6. The method of claim 1 further including rescheduling said flow rate and time of delivery of said fluid from the fluid network if said hydraulic capacity is not available.

7. The method of claim 1 including said computer controlled fluid network controlling operation of a hybrid pump to maintain pressure head.

8. The method of claim 1 said plurality of valves include bi-foldable barrier members pivoting along a central axis to provide an approximately linear relationship between the opening of the bi-foldable barrier members and the fluid flow.

9. The method of claim 1 wherein said predetermined parameter includes business rules and constraints to allow for further variations of said flow rate and time of delivery of said fluid through any valve.

10. The method of claim 1, wherein any subsequent flow rate and time delivery request resulting in the maximum and minimum thresholds of flow limits through said fluid network being breached will be denied or rescheduled to allow said subsequent request to proceed based on said calculated parameters.

11. The method of claim 1 wherein the request is a request for irrigation water.

12. The method of claim 1 wherein the predetermined limits are to maintain the pipe network full.

13. A demand management and control system for demand management and control of a pipe network;

the pipe network being a fluid network and of limited pressure head or gravity fed;

the pipe network including a plurality of outlet valves through which fluid is deliverable;

the valves being automated to maintain desired flows at the valves;

the system including a computer configured to:
   maintain a real time database within said computer controlled fluid network; and
   receive through a user interface a request for a delivery of the fluid from at least one of the valves;

the request including a flow rate and a time of the delivery;

the database being of predetermined parameters including flow schedules and capabilities of the plurality of valves;

the computer being configured to
   determine, using the predetermined parameters from the real time database, whether the network has hydraulic capacity to deliver the delivery; and
   if said hydraulic capacity is available, monitor and adjustably control the at least one valve and at least one other of the plurality of valves to deliver the delivery and to maintain the desired flows and manage pressure head within the fluid pipe network between predetermined limits;

the adjustably controlling including
   calculating, using the real time database, estimated positions for
     the at least one of the plurality of valves; and
     the at least one other of the plurality of valves;
   adjusting to the estimated positions
     the at least one of the plurality of valves; and
     the at least one other of the plurality of valves in anticipation of a variation of pressure head in the fluid pipe network due to the delivery.

14. A fluid delivery system including the system of claim 13 and the pipe network.

\* \* \* \* \*